April 10, 1956

G. C. MORRIS ET AL 2,741,057

FISH LURE CONSTRUCTION

Filed April 27, 1953

Gordon C. Morris
Rickles N. Adkins
INVENTORS.

BY

April 10, 1956 G. C. MORRIS ET AL 2,741,057
FISH LURE CONSTRUCTION
Filed April 27, 1953 2 Sheets-Sheet 2
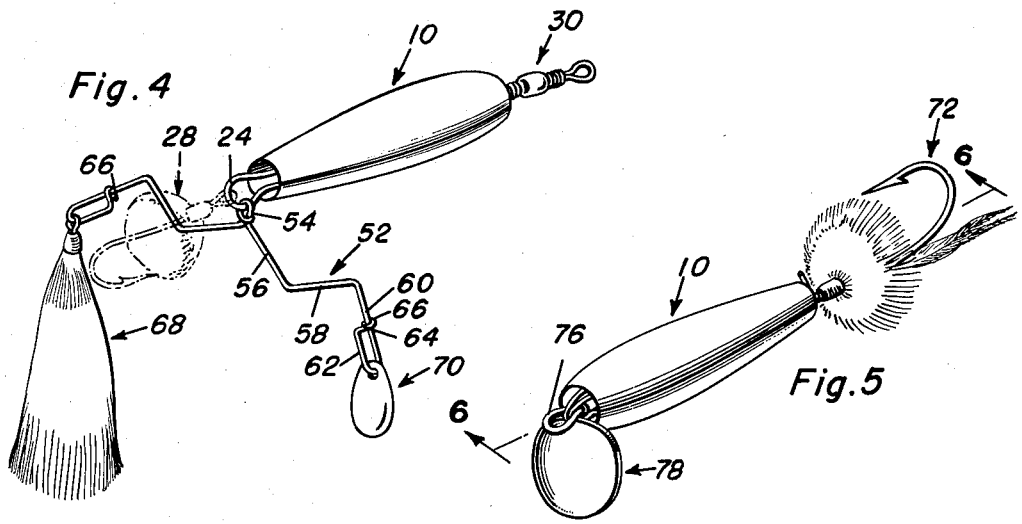
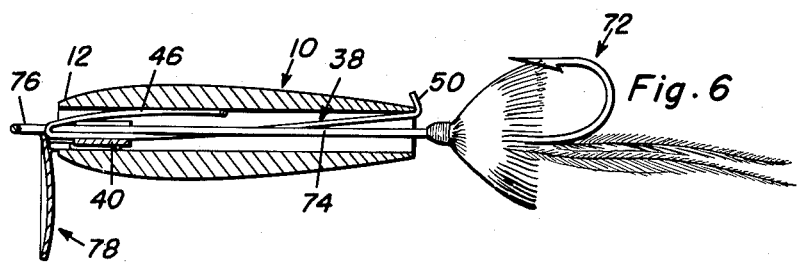
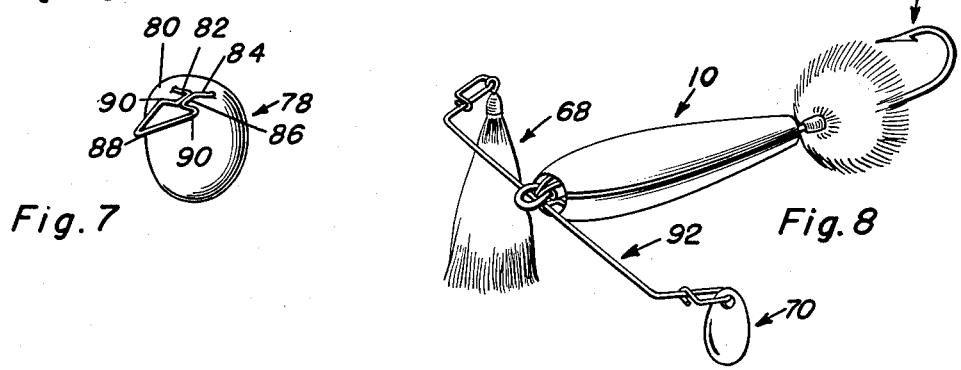
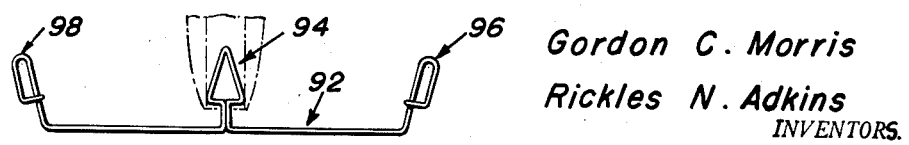
Gordon C. Morris
Rickles N. Adkins
INVENTORS.

United States Patent Office 2,741,057
Patented Apr. 10, 1956

2,741,057

FISH LURE CONSTRUCTION

Gordon C. Morris and Rickles N. Adkins,
Klamath Falls, Oreg.

Application April 27, 1953, Serial No. 351,216

3 Claims. (Cl. 43—42.09)

This invention relates generally to fishermen's accessories and pertains more particularly to an improved lure assembly.

A primary object of this invention is to provide a lure assembly which may be easily and readily changed in character to meet varying fishing conditions.

Another object of this invention is to provide a lure assembly having a main portion in the form of an elongated tubular body to which various readily attachable and detachable attachments may be secured to provide variable lures.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a perspective view of the device shown in Figure 1 showing a modified form of attachment;

Figure 5 is another perspective view similar to Figure 1 but showing a modified form of assembly;

Figure 6 is a vertical section taken substantially along the plane of section line 6—6 of Fig. 5 showing details of the internal construction;

Figure 7 is a perspective view of the spoon lure;

Figure 8 is a perspective view of a modified form of the invention; and

Figure 9 is a plan view of the modified attachment as utilized in Figure 8.

Figure 1:
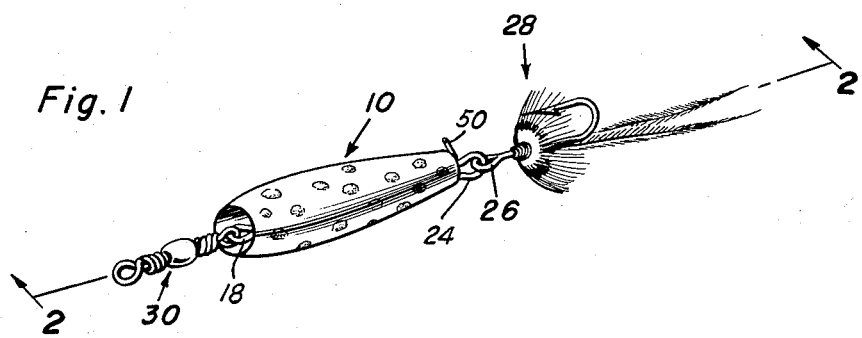
Figure 1 is a perspective view of the fish lure.
Figure 2:
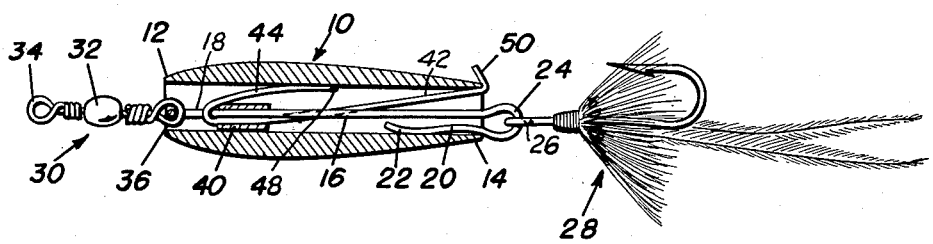
Figure 2 is a vertical section taken substantially along the section line 2—2 of Figure 1 showing details of the internal construction of the lure on an enlarged scale.
Figure 3:
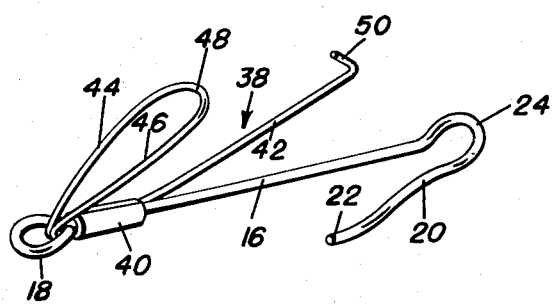
Figure 3 is a perspective view of the retaining assembly on an enlarged scale.

Referring now more particularly to Figures 1–3, reference numeral 10 indicates generally the main portion of the device which constitutes an elongated tubular body having a front end 12 and a rear end 14. The hook and line retaining member comprises a shank portion 16 which extends concentrically within the bore of the tubular member 10 and the forward end of this member is provided with an eye 18 and its rearward end is deformed or bent to terminates in a leg portion 20 underlying a portion of the shank 16, this leg being of serpentine configuration and terminating in an end 22 directed toward the shank 16. The bight portion 24 of this retaining means is adapted to project beyond the rear end of the tubular body and receives the eye 26 of the fly device 28. The forward eye 18 of the retaining means is adapted to receive a line or one end of a lure device 30 which is provided with an attracting bead 32 and a forward fishing line receiving eye 34, the rearward end being provided with the eye 36 interengaged with the eye 18 of the retaining means.

Referring now more particularly to Figure 3, it will be seen that a spring device 38 is secured by the split collar 40 to the forward end of the shank 16 adjacent the eye 18 and that the straight portion 42 of this spring device is provided with a looped forward end defined by the spaced legs 44 and 46 joined by the bight portion 48, the free end of the leg 46 being contiguous with the straight portion 42 and clamped therewith into engagement with the shank 16 by the previously mentioned split collar 40. This looped end of the spring means extends through the opening of the eye 18 in a threaded fashion and is bent backwardly upon the straight portion 42 to overlie the same as will be clear. The rearward end of the straight portion 42 is provided with an angularly bent ear 50 defining an acute angle with the straight portion.

Referring now more particularly to Figure 2 as well as Figure 3, it will be seen that the legs 44 and 46 of the spring means and the leg 20 of the retainer means and also the straight portion 42 of the spring means are normally spaced quite far from the shank 16 as shown in Figure 3, that is, each of these portions is quite sharply divergent with respect to the shank 16. When the assembly shown in Figure 3 is inserted into the bore of the tubular member 10, these members are deformed and resiliently engage against the inner surface of the tubular member to secure the assembly in place, the ear 50 engaging the rearward end 14 of the tubular member and preventing relative movement between the assembly shown in Figure 3 and the tubular body member in one direction. Of course, the frictional engagement between the legs 44 and 46, the ear 50 and the leg 20 and the inner surface of the tubular member is sufficient to maintain the two assemblies in properly related position, the engagement of the ear 50 with the end portion of the tubular member serving to positively prevent relative longitudinal movement in one direction between the tubular body member and the assembly shown in Figure 3.

Referring now more particularly to Figure 4, the assembly shown is identical in construction to the assembly shown in Figures 1–3 with the exception that the bight portion 24 of the retaining means carries the lure assembly 52 in addition to the fly device 28. The lure assembly is formed from a length of spring wire and extends in a transverse direction with respect to the body member 10 and is twisted at its center portion to provide a looped eye 54 which may be slipped over the leg portion 20 into engagement with the bight portion 24. Each portion of the wire to the opposite sides of the central portion are formed in similar manner and one only will be described. Each portion consists of a series of angularly disposed straight wire portions 56, 58 and 60 which might more properly be termed as extending in zig-zag fashion from the central portion of the wire and it will be seen that the straight section 60 terminates in a generally U-shaped clip assembly provided by the leg portion 62 bent reversely upon the main portion of this section and provided at its free end with a laterally bent ear 64 defining a hook 66 at its end. In this manner, the clip assemblies may be engaged or disengaged with lures such as the tassel 68 or spoon 70 by merely manipulating the hooked end 66. In this respect, it will be noted that the clip portion is resilient in nature and will normally spring apart when the hook is disengaged from the straight section 60.

Referring more particularly now to Figures 5 and 6, a modified form of assembly is shown wherein the previously described spring means may be utilized in conjunction with a long shank hook 72, the shank 74 of which is utilized in replacing the previously described retaining means. This shank terminates at its forward end in a fishing line retaining eye 76 and the main portion of the shank extends through the tubular member 10 with the previously described spring means 38 being secured by the split collar 40 to a forward portion of the shank 74 adjacent the eye 76, this spring means being related to the shank and eye of the long shank hook in identical manner as such means is associated with the retaining assembly of Figure 3.

It will be noted that the spring assembly 38 maintains itself and the hook assembly in proper position with the tubular body member by virtue of the frictional engagement of the spaced legs 44 and 46 with the inner surface of the tubular body member, the ear 50 of course preventing the relative longitudinal displacement in one direction as previously described.

Referring now more particularly to Figures 6 and 7, a spoon 78 of any suitable shape may be secured at the forward end 12 of the tubular body member, the attachment being effected by the plug or insert device 80 which is secured adjacent the edge of the spoon. This device consists of a length of spring wire bent to the configuration shown which includes the oppositely extending opposite end portions 82 and 84 which are hooked at their free extremities into slightly elongated openings in the spoon, these ends being continuations of the normally spaced apart parallel leg portions 86 which are laterally disposed thereof as shown. The central portion of the wire of which the plug or insert devices are formed is generally arrow-shaped in construction presenting the point 88 and spaced wings 90. In operation, the insert is forced into the longitudinal bore of the tubular body member with the wings 90 in engagement with the inner surface thereof so that the leg portions 86 are urged toward each other and the resiliency of the insert maintains the spoon in place. Also, the split collar 40 will serve to maintain the inserts in proper frictional engagement with the inner surface of the body member as will be readily apparent from Figure 6.

Referring now more particularly to Figures 8 and 9, the main portion of the construction is identical to that shown in Figures 5 and 6 with the exception that the spoon 78 is replaced by the lure assembly 92. This assembly comprises an elongated length of spring wire provided with the insert or plug portion 94 at its medial portion and provided at its opposite ends with the clip assemblies 96 and 98. In this respect, to avoid duplicative description, it is pointed out that the insert or plug portion 94 is identical in construction to the previously described plug assembly 80 and the clips 96 and 98 are also identical to the previously described clip assemblies 62, 64 and 66. In the construction shown in Figure 8, a tassel 68 and a spoon 70 are secured to opposite ends of the lure assembly.

It will be readily appreciated that the various lure attachments described above may be utilized with either the construction shown in Figures 1–3 or that shown in Figures 5 and 6. In any event, it will be seen that the devices shown may be readily disassembled into their component parts for allowing different types of flies or lure attachments to be secured thereto.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An artificial bait device comprising an elongated body having a longitudinal bore therethrough, means extending through said bore terminating in a barbed hook outwardly of said body at the trailing end of said body, and terminating at the leading end of the body in an eye, and complemental means located almost wholly within said bore and carried by the first mentioned means for preventing relative movement of the body toward said hook, said complemental means including a length of resilient material having a portion threaded through said eye and a companion portion reversely bent upon itself at one end, the other end of said material being laterally bent and releasably engaged with the trailing end of said body.

2. An artificial bait comprising an elongated body having a longitudinal bore extending axially therethrough and opening through the leading and trailing ends of said body, a hook and line retaining member embodying a shank portion extending concentrically through the bore of said body and provided with a line accommodating eye at the leading end of said bore and having means at the trailing end of the bore to accommodate a fishhook or the like, and a spring device carried by and complemental to said retaining member and for effecting separable connection between said retaining member and body and embodying a resilient loop-shaped portion attached to and extending obliquely from said shank and having a free end portion in yieldable contact with a surface portion of the bore in said body, and also having a linearly straight portion also at an oblique angle to said shank and extending rearwardly through the bore and having its rear end formed with a lateral bend providing a retaining ear, said ear being releasably engaged with the trailing end of said body.

3. For use in conjunction with a readily applicable and removable elongated tubular body having an axial bore opening through the leading and trailing ends of the body, a hook and line retaining member comprising a shank portion provided at its leading end with an eye adapted to accommodate a line and provided at its trailing end with a resilient return bend defining a bight portion and a complemental leg portion underlying the adjacent cooperating portion of said shank portion, and a spring device whereby said hook and line retaining member may be resiliently and separably connected with said body and comprising a resilient straight portion secured at its forward end to said shank portion and having a free rearward end terminating in a lateral bend and providing an ear disposed at an acute angle and adapted to releasably engage the trailing end of the stated body, and a resilient loop-shaped portion cooperable with said eye and connected with said shank portion and disposed at an oblique angle to said shank portion and adapted to be confined in the bore of the body in a manner to frictionally engage the wall of the bore.

References Cited in the file of this patent

UNITED STATES PATENTS

| | | |
|---|---|---|
| 1,516,940 | Winchell | Nov. 25, 1924 |
| 1,548,662 | Crawford | Aug. 4, 1925 |
| 1,929,150 | Peckinpaugh | Oct. 3, 1933 |
| 2,214,668 | Erickson | Sept. 10, 1940 |
| 2,264,883 | Lent | Dec. 2, 1941 |
| 2,583,863 | Lysen | Jan. 29, 1952 |
| 2,591,391 | Walsh | Apr. 1, 1952 |